United States Patent
Lyras et al.

(10) Patent No.: US 10,092,996 B2
(45) Date of Patent: Oct. 9, 2018

(54) UNITIZED CONTAINER BASED ABRASIVE BLASTING MATERIAL SEPARATION SYSTEM

(71) Applicants: Gus Lyras, Campbell, OH (US); Thomas A. Herrmann, Easton, CT (US); Anthony Nackino, Youngstown, OH (US)

(72) Inventors: Gus Lyras, Campbell, OH (US); Thomas A. Herrmann, Easton, CT (US); Anthony Nackino, Youngstown, OH (US)

(73) Assignee: ARS Recycling Systems, LLC, Lowellvillle, OH (US)

( * ) Notice: Subject to any disclaimer, the term of this patent is extended or adjusted under 35 U.S.C. 154(b) by 107 days.

(21) Appl. No.: 14/702,981

(22) Filed: May 4, 2015

(65) Prior Publication Data

US 2016/0325403 A1    Nov. 10, 2016

(51) Int. Cl.
*B24C 9/00* (2006.01)

(52) U.S. Cl.
CPC ............... *B24C 9/006* (2013.01); *B24C 9/00* (2013.01); *Y02P 70/179* (2015.11)

(58) Field of Classification Search
CPC . B24C 9/006; B24C 9/00; B24C 9/003; Y02P 70/179
See application file for complete search history.

(56) References Cited

U.S. PATENT DOCUMENTS

| | | | |
|---|---|---|---|
| 3,716,946 A | 2/1973 | Graf | |
| 3,934,374 A | 1/1976 | Leliaert | |
| 4,449,331 A | 5/1984 | MacMillan | |
| 4,773,189 A | 9/1988 | MacMillan et al. | |
| 4,943,368 A | 7/1990 | Gilbert et al. | |
| 5,035,089 A * | 7/1991 | Tillman | B24C 9/006 209/19 |
| 5,185,968 A | 2/1993 | Lyras | |
| 5,468,174 A | 11/1995 | Bachand et al. | |
| 5,520,288 A | 5/1996 | Drenter et al. | |
| 5,695,385 A | 12/1997 | Bachand et al. | |
| 5,882,381 A * | 3/1999 | Hauck | B01D 53/12 34/131 |
| 6,102,157 A * | 8/2000 | Goldbach | B05B 13/005 182/128 |
| 6,186,273 B1 * | 2/2001 | Goldbach | B05B 13/005 182/128 |
| 6,514,128 B1 | 2/2003 | Lyras | |
| 2012/0273396 A1 * | 11/2012 | Roden | B07B 1/10 209/235 |
| 2013/0157545 A1 * | 6/2013 | Roden | B24C 3/06 451/87 |

* cited by examiner

Primary Examiner — Christopher M Koehler
Assistant Examiner — Joel Crandall
(74) Attorney, Agent, or Firm — Harpman & Harpman (57) ABSTRACT

A compartmentalized multiple container base apparatus for separation and recovery of used contaminated abrasive blasting material at a remote work site. A self-contained unitized storage and cleaning system including cyclonic separation, multiple stage dust filters and magnetic drum, air wash and vibratory separation in a flow through contaminate and blast media separation process.

2 Claims, 11 Drawing Sheets

UNITIZED CONTAINER BASED ABRASIVE BLASTING MATERIAL SEPARATION SYSTEM

BACKGROUND OF THE INVENTION

1. Technical Field

This invention relates to separation and recycling of abrasive steel blast material from entrained contaminates, including paint dust and rust encountered during the blasting process in cleaning and preparing a variety of surfaces in the industry.

2. Description of Prior Art

Prior art devices and processes have been developed that utilize a variety of fixed and mobile separation apparatus that clean and separate waste materials from used shot blast recycling for reuse. Examples of prior art patents can be seen as follows: U.S. Pat. Nos. 3,716,941; 3,954,374; 4,449,331; 4,773,189 and 4,943,368. Additional patents by applicant are U.S. Pat. Nos. 5,185,986; 5,468,147; 5,520,288; 5,695,385 and 6,514,128.

In U.S. Pat. No. 4,773,189 a separation system is disclosed for polymer blasting media which is cited to show multiple tasks separation systems in which contaminated blast products are collected, processed and reused in a continuous manner. The hazardous contaminates being directed to separate disposable storage units within the process.

U.S. Pat. No. 3,716,946 uses a recirculation close system with air separation as the initial separation with a secondary magnetic separator for removal of ferrous shot from the remaining non-ferrous contaminates.

U.S. Pat. No. 4,449,331 shows shot blasting machinery used in communication with a blast cabinet module. The device is characterized by a feed and lift conveyor recirculating system in communication with the blast cabinet for transportation of spent contaminated shot to the top of a vertical separation stack.

U.S. Pat. No. 4,943,368, a non-metallic abrasive blasting material recovering process is disclosed having multiple steps of size classification, ferro-magnetic separation, gravity separation, electrostatic separation which is used in separation of non-conductive paint from conductive blasting media.

U.S. Pat. No. 3,934,374 a sand blast reclamation system is disclosed using an air wash separator feeding a blast wheel. Contaminated air is directed to a fabric dust collector for filtration. A sand separator is positioned above the magnetic separator supplying usable sand back to the blast wheel via an infernal elevator belt.

U.S. Pat. No. 2,810,991, an abrasive blasting apparatus is disclosed that provides for a movable self-contained blasting and separation unit that recovers the spent contaminated shot as it is used and recirculates same through a separation process. The separator uses an air driven grit reclaimer in combination with a transfer chamber.

In applicant's U.S. Pat. No. 5,185,968 a mobile separation system is disclosed wherein a multi-step magnetic and air wash separation is used.

U.S. Pat. No. 5,468,174 is directed to a recyclable abrasive blasting system having a classifier with auger screen separators and air wash.

U.S. Pat. No. 5,520,288 claims an abrasive grit material recovering system having a rotary screen separator, a magnetic separator, and an air wash on a mobile platform.

U.S. Pat. No. 5,695,385 shows a recyclable abrasive blasting system method using multiple auger screen separation and interconnected air wash to achieve particle separation.

Applicant's Patent 6,514,128 discloses a separating abrasive blasting media from debris using a rotary drum separator with different size gradation interior surfaces.

SUMMARY OF THE INVENTION

A containerized compact self-contained apparatus and system for separation of spent abrasive steel blast shot from entrained contaminates by use of multiple station material treatment. Multiple equipment shipping container platforms are stacked for inter-working engagement, each containing multiple material processing equipment stations interlinked to one another by fixed material flow aligned fittings and multiple flexible product in-feed and outflow of contaminate separation and recovery of usable clean abrasive blast media in transitional storage for direct reuse on the work site.

DESCRIPTION OF THE PREFERRED EMBODIMENT

A compartmentalized transportable multiple container based separation apparatus 10 for separating and recovering of used steel blast shot material can be seen in FIGS. 1 through 11 of the drawings.

Figure 7:
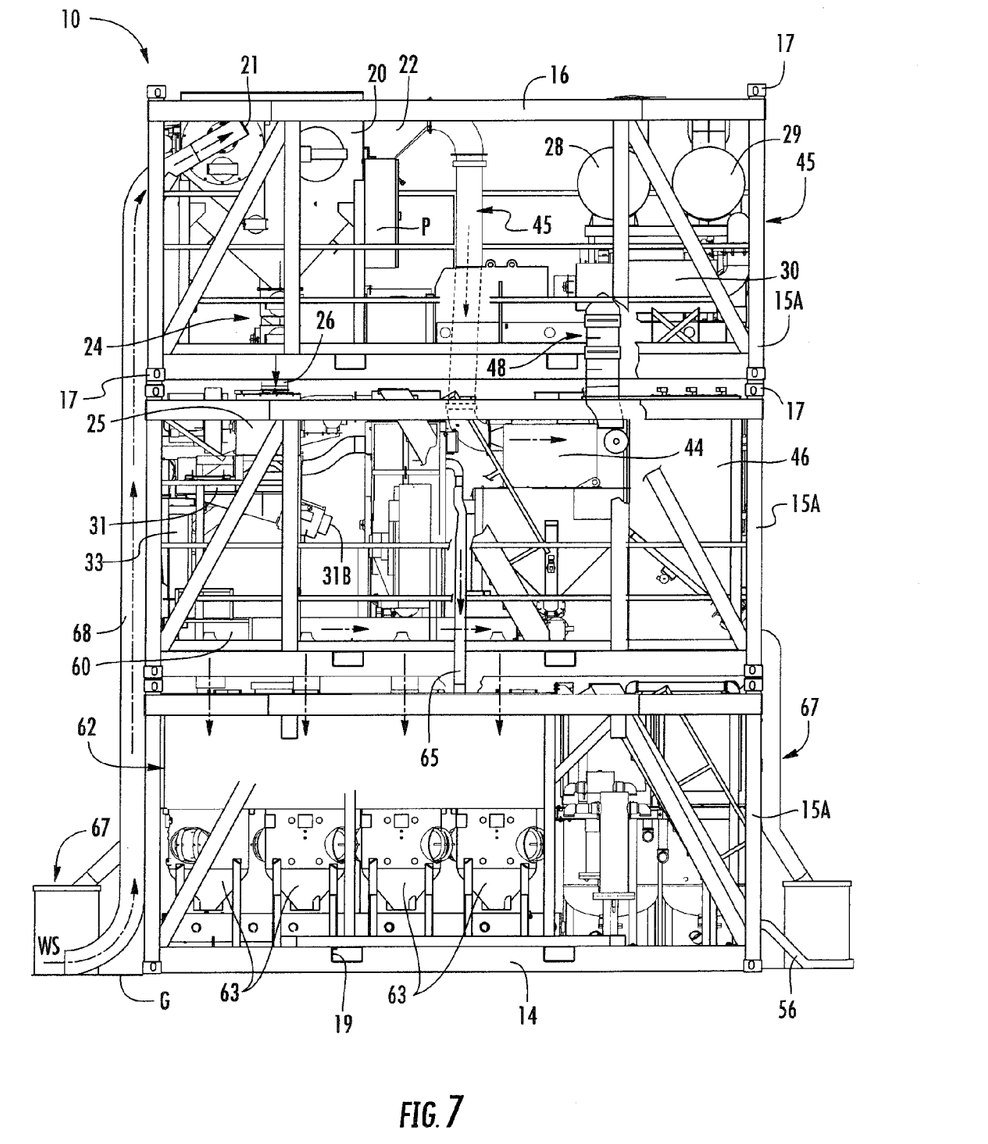
FIG. 7 is a front elevational view of the multiple equipment container modules in stacked and inter-connected and engaged position for use.
Figures 8, 9:
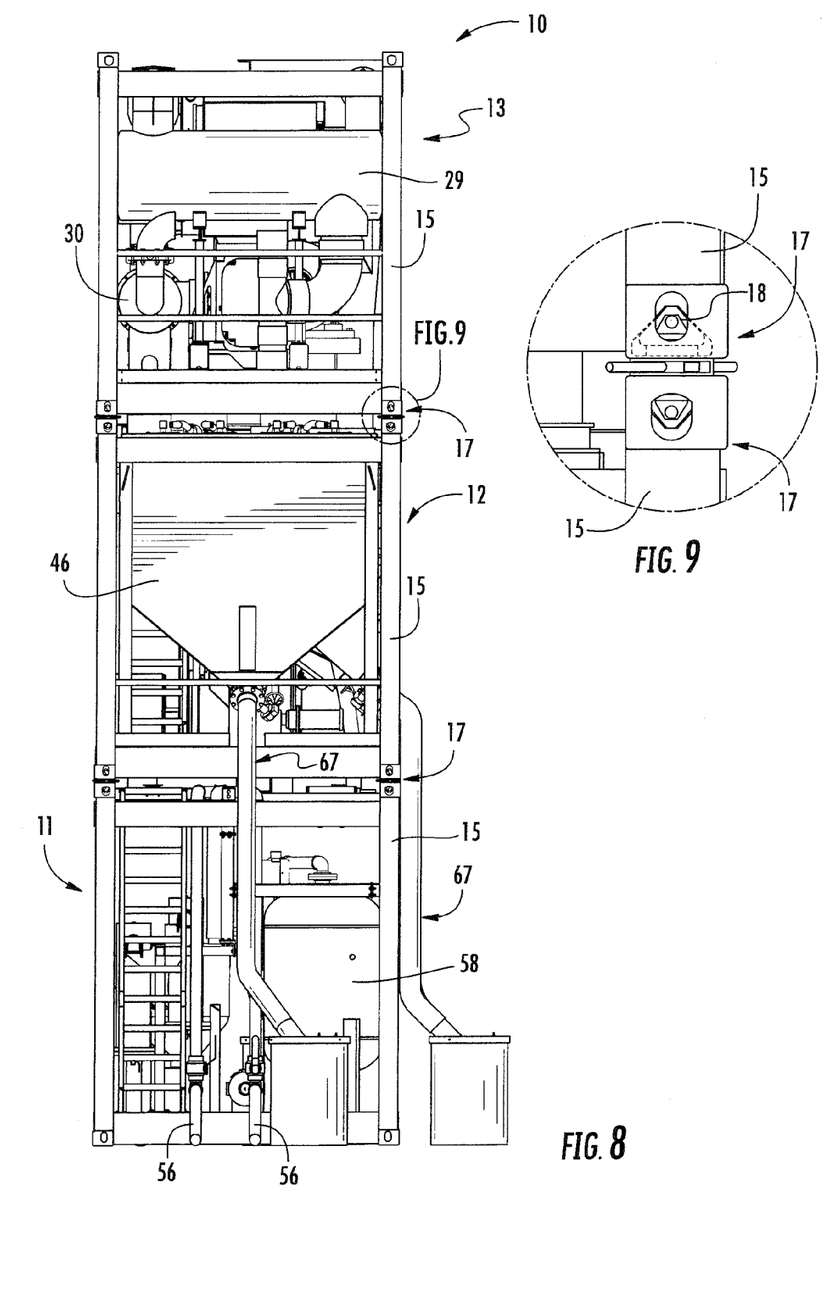
FIG. 8 is an end elevational view thereof.
FIG. 9 is an enlarged end elevational view of the equipment containers inter-locking corner fittings with portions broken away.
Figure 10:
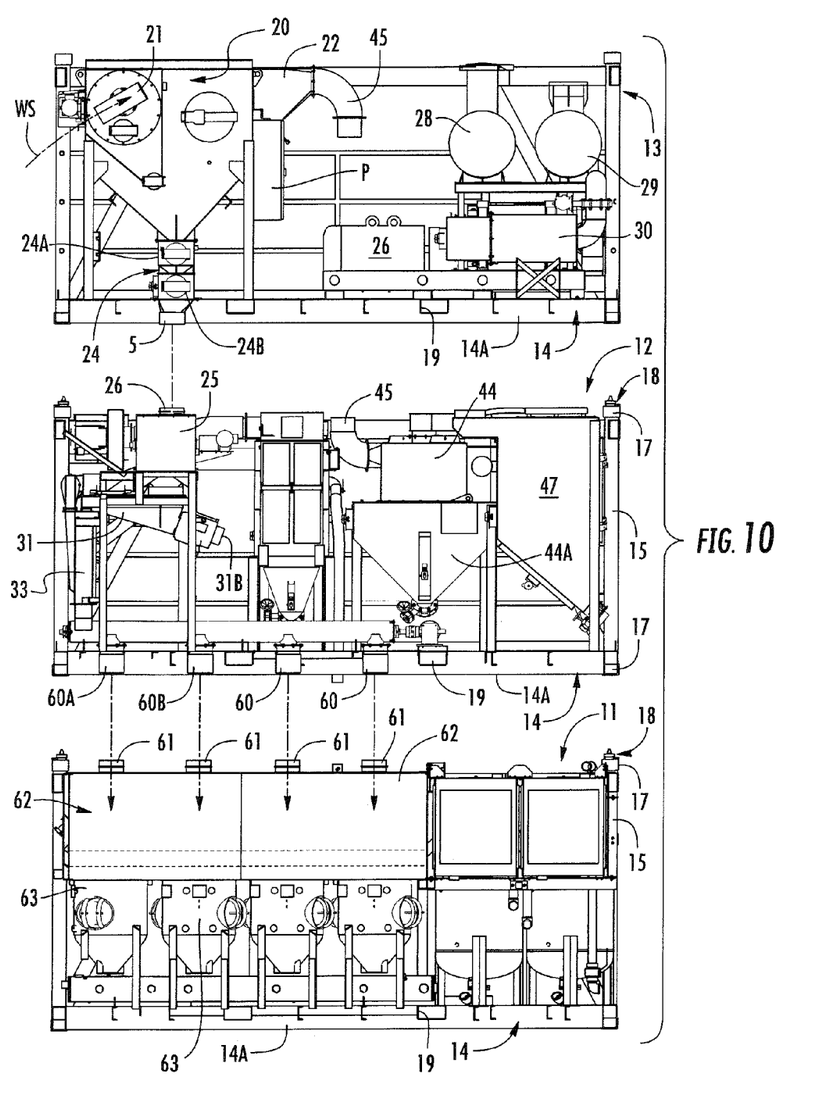
FIG. 10 is an exploded front elevational view with portions broken away of multiple containers illustrating the inter-connection fittings therebetween.
Figure 11:
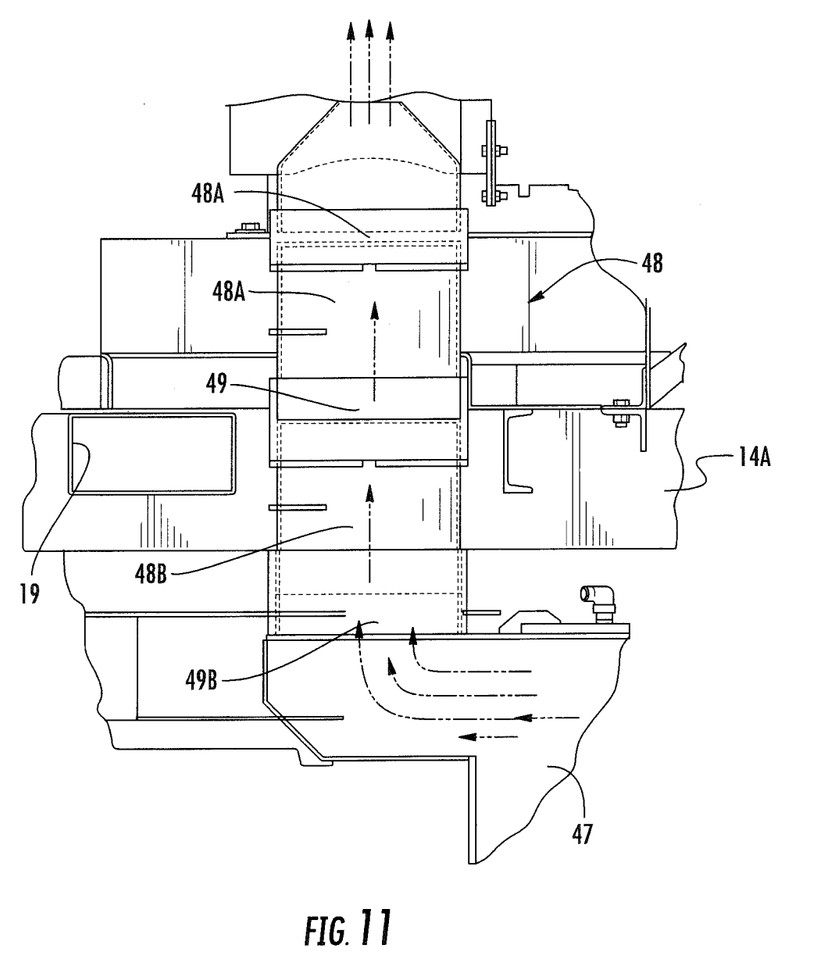
FIG. 11 is an enlarged elevational view of the interconnection of the high vacuum transition between containers with portions broken away.

The shippable container base separation apparatus 10 of the invention is assembled from self-contained shipping container-based modules 11, 12 and 13, each containing separation equipment arranged for interlinking dependency when stacked one upon another as seen in FIGS. 7, 8 and 10 of the drawings.

Each of the equipment modules 11, 12 and 13 are configured to standard dimensions and interlocking frame element of an intermodal freight container universally used worldwide.

The key to distinguishing structural features of such containers can be seen in each of the equipment modules 11, 12 and 13 having a rectangular base frame 14, each with multiple upstanding support posts 15 interconnected to a top rectangular support frame 16, as best seen in FIGS. 1 through 6 of the drawings. Each of the corner support posts 15 have an inter-engageable end fitting 17 of a universal intermodal freight container, best seen in FIG. 9 of the drawings. The end fittings 17 can therefore be secured to one another for vertical stacking by an internal twist-lock corner casting assembly 18 in which a male moveable twist-lock is inserted into a female opening in the adjacent container fitting to be engaged and secured together by rotation therewithin, as will be well understood by those skilled in the container art.

Each of the base frames 14 have parallel rails 14A and 14B with a corresponding space pair of forklift engagement openings 19 therein for lifting and placement, again as will be well understood by and known within the container art.

As seen in FIGS. 1 through 6 of the drawings, the top (first) equipment module 13 can be seen independently in an un-stacked orientation. The equipment module 13 has initial large debris (rocks) cylindrical screen drop out intake box 20 with a vacuum transfer inlet 21 for contaminated abrasive blast material CABM from the work site WS. The drop box 20 screens out and separates large debris while pulling off lighter dust and contaminates through a high vacuum outflow port at 22 which is transferred down to the second or middle equipment module 12, as will be discussed in greater detail hereinafter.

Figure 12:
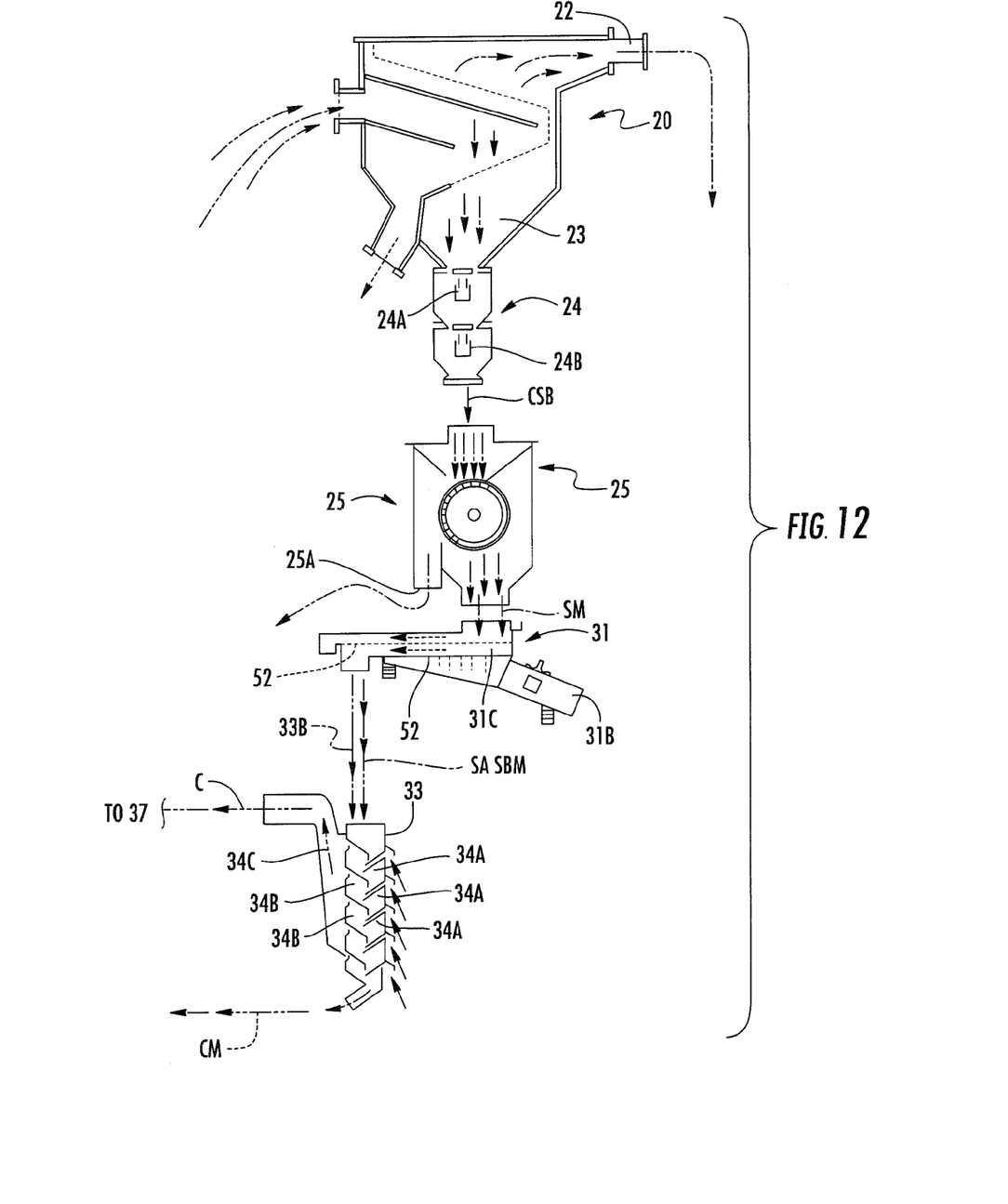
FIG. 12 is a graphic system process flow diagram of initial separation stations and equipment container modules 2 and 3.

The remaining used blast shot and entrained heavier contaminates from within the rock box 20 drop out and accumulate within a temporary accumulation area 23 therewithin, as seen graphically in FIG. 12 of the drawings. A double dump airlock assembly 24 has two compartmentalized dump valves 24A and 24B that selectively transfer accumulated contaminated blast shot, releasing directly into a magnetic drum separator 25 within the equipment module 12 positioned there below. The magnetic drum inlet transition connection is achieved therebetween by a rubber sleeve assembly 26 as seen in FIG. 10 of the drawings.

A large electric motor 26 is mounted adjacent to the double dump valve assembly 24 with a control panel P for a source of electrical power thereto. The motor 26 drives a large air vacuum pump 27 in communication with associated intake and exhaust silencers 28 and 29 and a final outflow filter 30, typically required in large vacuum system applications.

Figure 1:
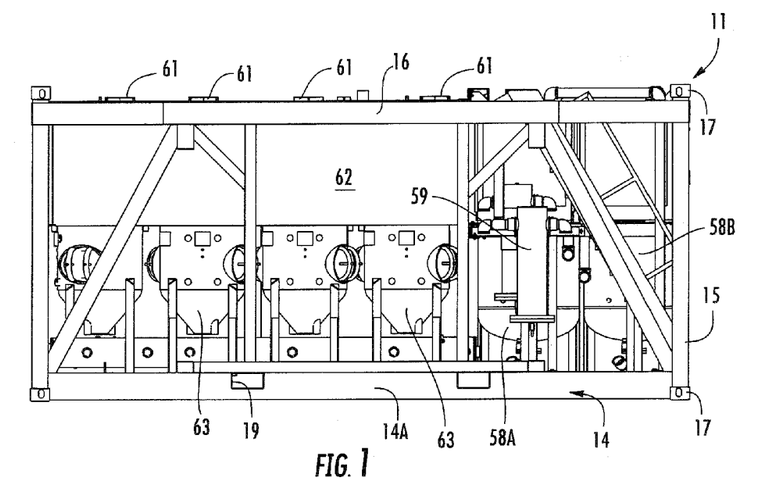
FIG. 1 is a front elevation view of a first equipment container module of the abrasive material separation apparatus and system of the invention.
Figure 2:
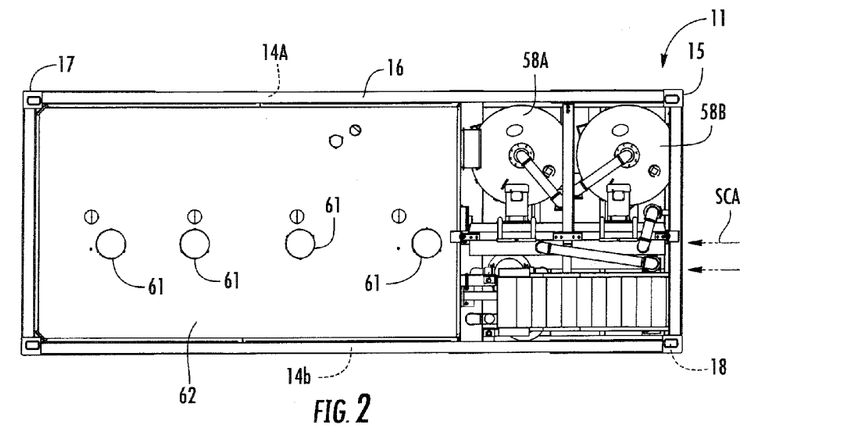
FIG. 2 is a top plan view thereof.
Figure 3:
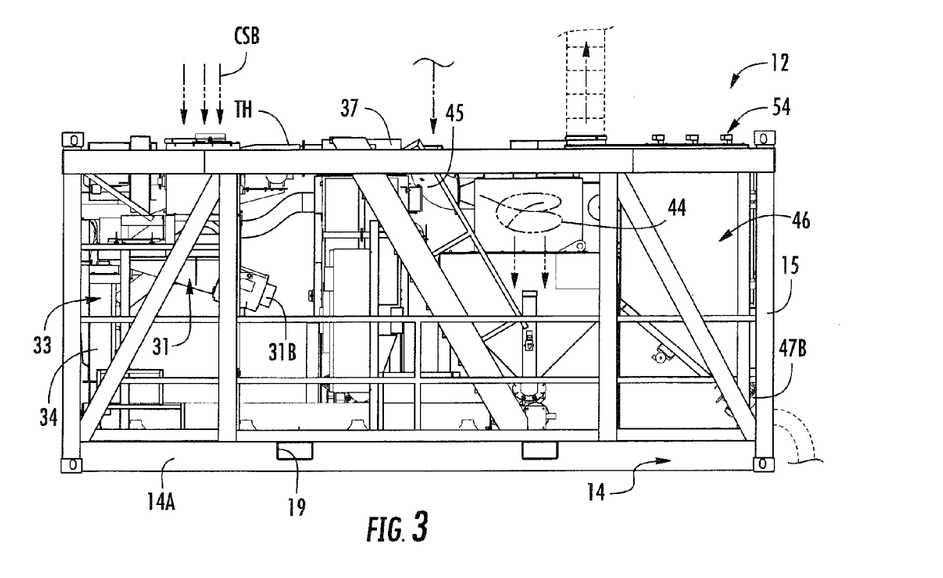
FIG. 3 is a front elevation view of a second container module of the invention.
Figure 4:
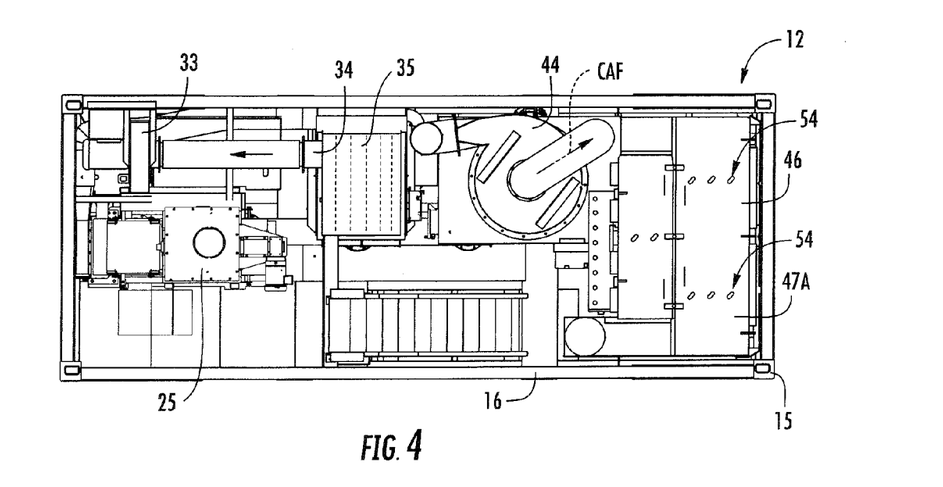
FIG. 4 is a top plan view thereof.
Figure 5:
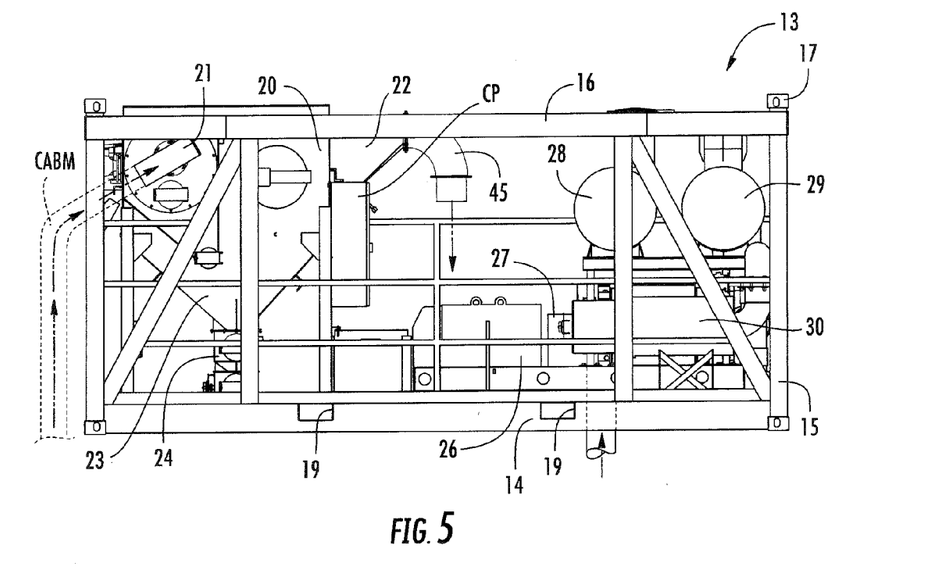
FIG. 5 is a front elevational view of a third equipment container s module of the invention.
Figure 6:
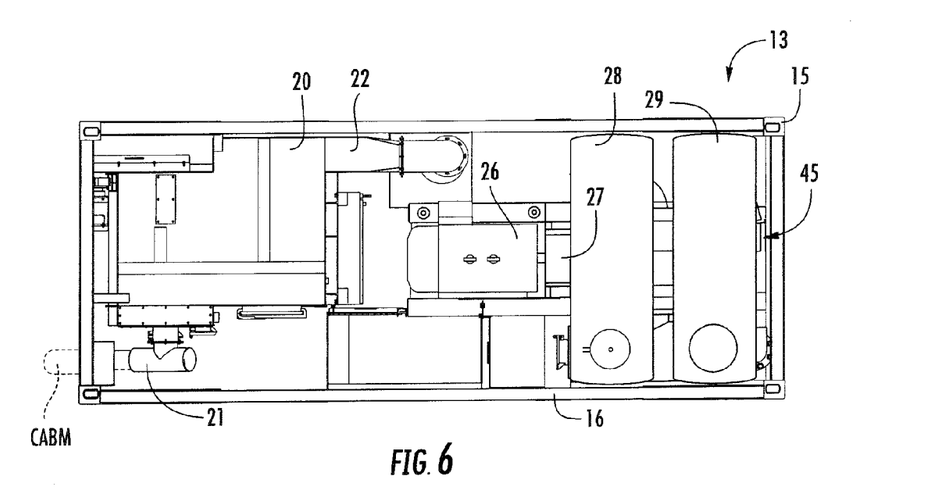
FIG. 6 is a top plan view thereof.

Referring now to FIGS. 3, 4 and 7 of the drawings, the second equipment module 12 can be seen containing hereinbefore referred to magnetic drum separator 25 that receives the contaminated shot blast and provides for selective particle engagement and magnetic attraction of contaminates, as is well known and established within the art. The separated debris exits at 25A seen graphically in FIG. 12 of the drawings. The remaining magnetically separated material SM is deposited directly onto a vibrating screen separator classifier 31 that will selectively sort and classify by screen designated size openings for screen selection.

Screened contents that exit at 31A are transferred to (waste) as designated large debris, while small contaminates 31B pass through screening trays S2 into a collection transfer guide at 31C, as will be well understood by those within the vibrating screen technology art used commercially within the industry.

A multi-stage the air washer 33 then receives the screened abrasive shot blast material SASBM and remaining entrained related contaminates (dust) 33B. The air washer 33 has a vertical chamber 34 having multiple angularly positioned veins 34A, each of which is adjacent to corresponding outside air inlet 34B so as to affect a specific gravity air separation of the contaminated abrasive blast material as it cascades downwardly therethrough by gravity, seen graphically in FIG. 12 of the drawings.

Figures 14, 16:
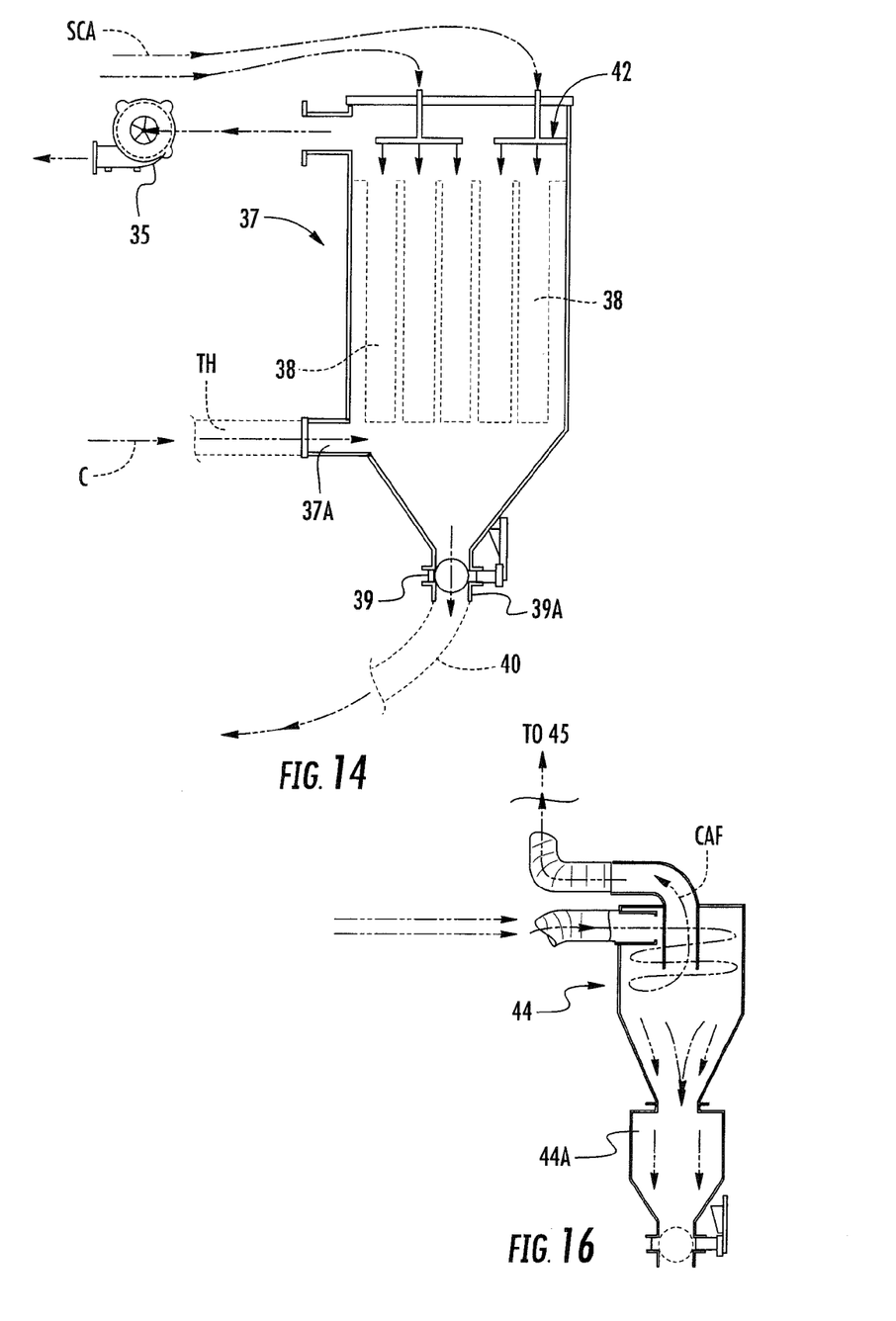
FIG. 14 is a graphic system flow diagram of a low vacuum dust recovery and air purge.
FIG. 16 is a graphic system process flow diagram of a cyclonic separator.

The air wash effectively separates entrained lighter weight contaminates C including dust, forcing same upwardly through a return and removable passage way 34C to be drawn off by a vacuum dust control system, comprising a low vac fan blower indicated at 35 connected by a transfer hose TH to an outlet 36 of a low vac cartridge bag based dust filter assembly 37 seen in FIGS. 3 and 4 and graphically in FIG. 14 of the drawings. The low vac dust filter bag base assembly 37 has a first contaminate material inlet at 37A with a plurality of dust collector filter bag cartridges 38 within, with maintenance access and oppositely disposed lower chamber clean-out valve 39.

A flexible dust transfer hose 40 extends from the clean-out valve 39 and fitting 39A down to a collection container 41 once the multiple equipment modules 11, 12 and 13 are stacked and fully connected to one another as will be described in greater detail hereinafter.

Figure 15:
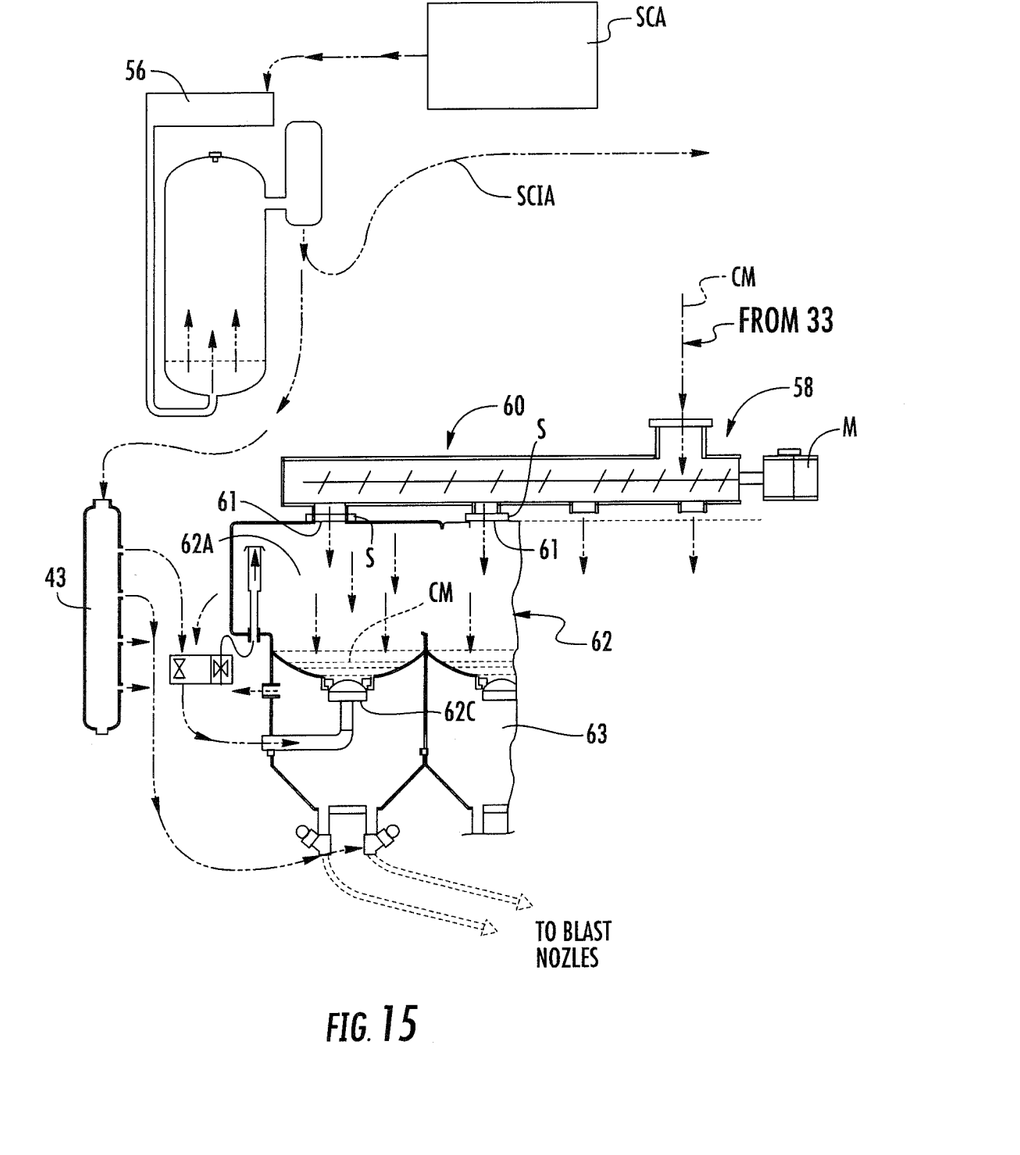
FIG. 15 is a graphic system process flow diagram of a blast storage bin and pot with transfer and compressed air source treatment and distribution.

The low vac cartridge bag based dust filter assembly 37 has a compressed air filter purged multiple nozzle assembly 42 positioned above the hereinbefore described multiple dust filter bag cartridges 38 and is in communication with a source of compressed air SCA via a distribution manifold 43 providing for bag filter cleaning as required, illustrated in FIG. 15 of the drawings.

Referring now back to FIGS. 3,4 and to FIG. 16 of the drawings, a cyclonic separator 44 within the equipment module 12 can be seen in communication with the outflow port 22 of the cylinder deposit drop box 20 described via a fixed and flexible transfer conduit piping 45 best seen in FIG. 7 of the drawings. The cyclonic air separator 44 pulls off the lighter contaminates in a cyclonic air stream allowing the remaining material to drop and accumulate within a storage area 44A. The lighter entrained contaminated air flow CAF is pulled into a high vacuum dust control system 45 consisting of the vacuum pump 27 having a three lobed air injector high vac blower 46 to supply vacuum circulation through a high vacuum dust filter and dust cartridge bag filtration house 47 via a vacuum transition piping assembly 48, best seen in FIG. 11 of the drawings. The transition piping assembly 48 has a pair of aligned transitioned tubes 48A and 48B interconnected together by a first rubber sleeve fitting 49.

Oppositely disposed secondary and third rubber sleeve fittings 49A and 49B connect the respective transition tubes 48A and 48B to a high vacuum outlet pipe fitting 50 and a final filter inlet pipe 51 on the final filter 30 in the first equipment module 13 in direct communication with the high vac blower 46.

Figure 13:
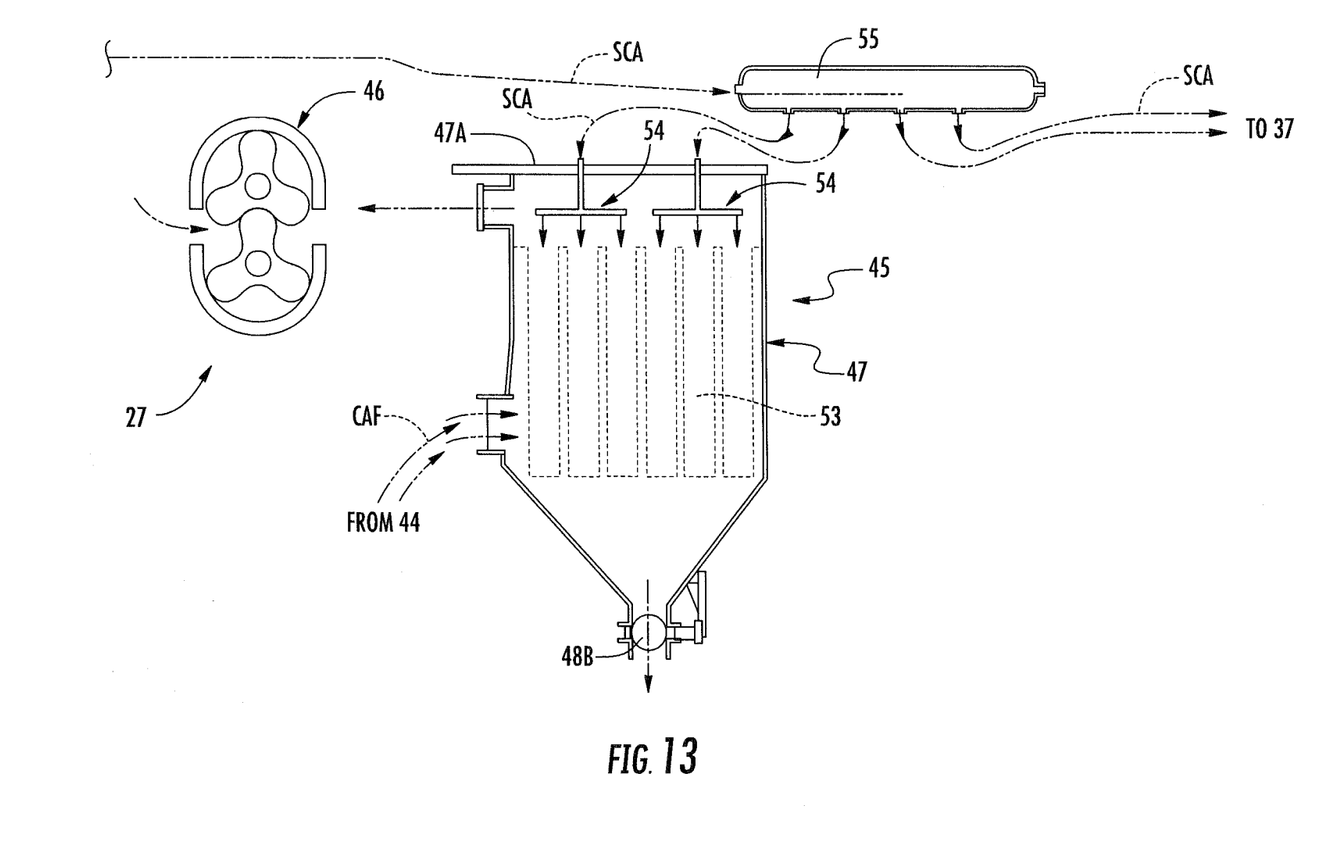
FIG. 13 is a graphic system process flow diagram of a high vacuum dust recovery.

The high vac dust cartridge bag filter house 47 has a plurality of dust collector filter bag cartridges 53, best seen graphically in FIG. 13 of the drawings.

An air purge nozzle assembly 54 is positioned within the high vac dust filter bag cartridge house 47 above respective filter bag cartridges 53 and is in communication with a source of compressed air SCA manifold 55 and a remote air source via a compressed air system inlets 56, best seen in FIG. 7 of the drawing, extending from the base of the third equipment module 11. Multiple in line air dryers 58 A&B air filter 59 seen in FIGS. 1 and 8 of the drawings, and graphically in FIG. 16 of the drawings. Compressed air manifold also supplies a purge nozzle assembly 54 in the low vacuum bag house 37.

The high vacuum dust filter cartridge bag filter house 47 has a top access panel 47A and a lower chamber clean-out valve 47B.

Referring back to FIG. 15 of the drawings, the now cleaned and reusable shot blast material indicated in broken line arrows CM exit the air wash 33 directly into a transfer distribution screw auger 60, which conveys the shot blast material CM to multiple inlet fittings 61 of a grit storage bin portion 62 in the equipment module 11 on the ground G. It will be seen that the bin to auger connections were achieved during the modular stacking assembly, using in this instance a plurality of rubber sleeves S installed on respective auger discharge pipes 60A, 60B, 60C and 60D. The grit storage bin 62 portion has a plurality of integral shot blast supply pots 63. The clean blast shot CM is initially held as noted in the upper portion 62A separated by a contoured bottom 62B with a remotely operated material release valve 62C for releasing the material therefrom into the lower blast pot portions 63 ready for reuse, as will be described hereinafter.

In operation, the intermodal equipment modules 11,12 and 13 can be easily transported independently to their intended work site destination given their uniform "shipping container" configurations. Upon arriving at the site, the equipment modules 11, 12 and 13 are prepared for vertical integrated stacking by installing a multiple interconnecting resilient sleeve S and fixed connector elements between the equipment modules, including the auger outlets 60A, 60B, 60C, and 60D and blast shot storage bins 62, along with the connection from the double dump valve assembly 24 of the rock box 20 with the magnetic drum 25 in-feed.

Additionally, multiple flexible sleeve and fitting assemblies 48 is positioned for connection between the final air filter 30 and the high vac filter housing 47 and the flexible hose 45 and sleeve fittings between the air outflow and rock box 20 and cyclonic separator 44, as hereinbefore described.

To aid in the proper orientation of the equipment modules 11, 12 and 13 in the stacking sequence, a stacking and alignment and orientation is achieved by color coding one corner support post 15A on each of the modules, so that the colored post matching assures proper alignment. As noted, the equipment modules 11, 12 and 13 are selective locked to one another by the respective post twist-lock fitting 17. Once the primary interconnection fittings between the equipment modules 11, 12 and 13 have been achieved, a low vacuum scavenger hose 65 is secured between the low vacuum bag house 37 and a grit bin scavenge port 66, best seen in FIG. 10 of the drawings in dotted lines and directional flow arrows.

Multiple exterior debris removal hoses and barrel collector assemblies 67 are installed from the respective cyclonic separator 44, low and high vac bag assembly housings 37 and 47 and vibrating tray 31. An exterior vacuum inlet hose 68 extends up the equipment stack and is in communication with the rock box vacuum inlet 21 and the work site WS to initiate the collection and transfer of the used contaminated shot blast entrained with a variety of contaminates to begin the separation process of the compartmentalized transportable multiple intermodal container modules base system of the invention.

It will thus be seen that a containerized compact, self-contained apparatus and system for the separation of spent asbestos steel blast shot material from entrained contaminates has been illustrated and described, and will be apparent to those skilled in the art that various changes and modifications may be made thereto without departing from the spirit of the invention.

Therefore we claim:

1. An apparatus for recycling abrasive blasting material comprises in combination,
    a plurality of independently transportable, stackable multiple compartmentalized equipment containing modules, all of the modules of equal exterior longitudinal dimension and equal exterior transverse dimension and equal exterior height dimension to one another being of identical shapes and sizes with interlocking module to module frame elements;
    a plurality of separation and recovery apparatus components in each of said plurality of modules;
    material transfer fittings between the separation and recovery apparatus components in each of the respective modules,
    interlinking module material transfer fittings between each of said modules, said modules comprising;
    a first module having;
    a large debris separator, an air separator; and
    a source of high vacuum air flow;
    a second module in stacked interlocked communication with said first module,
    said second module having;
    a magnetic drum separator in material communication with said large debris separator and said air separator, in said first equipment module,
    a vibratory screen separator in communication with outflow of said magnetic drum separator,
    a material air wash and a low vacuum dust filter in communication with outflow of said vibratory screen separator,
    a low vacuum source for drawing off contaminates from said air material wash;
    a cyclonic air separator in communication with said air separator and said source of high vacuum air flow in the first equipment module for drawing off contaminates,
    a high vacuum dust filter in communication with the cyclonic air separator and said source of high vacuum air flow and
    a distribution auger in communication with material out flow from said air material wash;
    a third module comprising;
    a material supply bin in communication with said distribution auger in said second module,
    blast pots in communication with said material supply bin,
    a source of compressed air and compressed air treatment in communication with to said low and high dust filters, compressed air distribution manifolds for selectively purging said low and high dust filters and blast material outlets in said material supply bin, a source of electrical power and a control system for said separation and recovery apparatus components in said interconnected and interlocked multiple compartmentalized modules.

2. A method for separation and recovery of contaminated abrasive blasting material from a work site comprising the steps of;

a. assembling multiple intermedial shipping container modules in stacked interlinking material transfer orientation with one another, the container modules each having equal longitudinal, transverse and height exterior dimensions to one another being of identical shapes and sizes, each container module contains equipment for separating and recovering the contaminated abrasive blasting material, b. supplying contaminated blast shot from a work site to a first container module of the multiple container modules by a source of inlet vacuum, c. transferring blast shot from said first container module to a second container module of the multiple container modules, d. transferring separated blast shot contaminants from said first and second container module to multiple waste collection containers, e. transferring clean abrasive shot blast from said second container module to a third compartmentalized material and dispensing container module of the multiple container modules, f. storing and dispensing cleaned abrasive shot material for reuse from said third compartmentalized material and dispensing container module.

* * * * *